United States Patent
Chien

(10) Patent No.: US 10,739,632 B2
(45) Date of Patent: Aug. 11, 2020

(54) LIQUID CRYSTAL DISPLAY PANEL AND LIQUID CRYSTAL DISPLAY APPARATUS

(71) Applicants: HKC Corporation Limited, Shenzhen (CN); Chongqing HKC Optoelectronics Technology Co., Ltd., Chongqing (CN)

(72) Inventor: Chung-Kuang Chien, Chongqing (CN)

(73) Assignees: HKC CORPORATION LIMITED, Shenzhen (CN); CHONGQING HKC OPTOELECTRONICS TECHNOLOGY CO., LTD., Chongqing (CN)

( * ) Notice: Subject to any disclaimer, the term of this patent is extended or adjusted under 35 U.S.C. 154(b) by 0 days.

(21) Appl. No.: 16/342,198

(22) PCT Filed: Apr. 20, 2017

(86) PCT No.: PCT/CN2017/081224
§ 371 (c)(1),
(2) Date: Apr. 15, 2019

(87) PCT Pub. No.: WO2018/120528
PCT Pub. Date: Jul. 5, 2018

(65) Prior Publication Data
US 2019/0243182 A1 Aug. 8, 2019

(30) Foreign Application Priority Data
Dec. 29, 2016 (CN) .......................... 2016 1 1266322

(51) Int. Cl.
*G02F 1/1335* (2006.01)
*G02F 1/13357* (2006.01)

(52) U.S. Cl.
CPC .. *G02F 1/133512* (2013.01); *G02F 1/133514* (2013.01); *G02F 1/133553* (2013.01); *G02F 1/133605* (2013.01)

(58) Field of Classification Search
CPC ......... G02F 1/133512; G02F 1/133553; G02F 1/133605; G02F 1/133606; G02F 2203/03; G02B 5/201; G02B 5/0808
See application file for complete search history.

(56) References Cited

U.S. PATENT DOCUMENTS 6,608,660 B1 * 8/2003 Okamoto .......... G02F 1/133514
349/113
7,242,447 B2 * 7/2007 Nakano ............. G02F 1/133514
349/106
(Continued)

FOREIGN PATENT DOCUMENTS

| CN | 1991487 A | 7/2007 |
| CN | 101556397 A | 10/2009 |

(Continued)

OTHER PUBLICATIONS

Xiaodong Wang, the International Searching Authority written comments, dated Sep. 2017, CN.
(Continued)

*Primary Examiner* — Jia X Pan

(57) ABSTRACT

The present application provides a liquid crystal display panel and a liquid crystal display apparatus. The liquid crystal display panel is used in the liquid crystal display apparatus, and the liquid crystal display panel includes a color filter substrate including a substrate, a shading layer disposed on the substrate, and a color filter layer. The shading layer is configured to reflect light rays, and when the light rays are irradiated to the shading layer, the shading
(Continued)

layer reflects the light rays. The color filter layer is disposed on the substrate and is spaced by the shading layer.

8 Claims, 6 Drawing Sheets

(56) References Cited

U.S. PATENT DOCUMENTS

| | | | | |
|---|---|---|---|---|
| 2003/0030055 | A1* | 2/2003 | Nakano | G02F 1/133555 257/72 |
| 2005/0062906 | A1* | 3/2005 | Ishizaki | G02F 1/13362 349/96 |
| 2005/0179839 | A1* | 8/2005 | Jung | G02F 1/133514 349/113 |
| 2007/0200975 | A1* | 8/2007 | Kamijima | G02F 1/1303 349/95 |
| 2011/0141413 | A1* | 6/2011 | Sakai | G02B 5/003 349/110 |
| 2014/0160408 | A1* | 6/2014 | Cho | G02F 1/133617 349/110 |
| 2014/0367711 | A1* | 12/2014 | Bibl | H01L 24/24 257/89 |
| 2015/0055063 | A1* | 2/2015 | Hsieh | G02F 1/133753 349/99 |
| 2015/0205159 | A1* | 7/2015 | Itou | G02F 1/133514 349/110 |
| 2015/0362644 | A1* | 12/2015 | Tian | G02B 5/0808 359/891 |

FOREIGN PATENT DOCUMENTS

| | | |
|---|---|---|
| CN | 202008538 U | 10/2011 |
| CN | 104656306 A | 5/2015 |
| CN | 104834126 A | 8/2015 |
| CN | 105807483 A | 7/2016 |
| CN | 105974641 A | 9/2016 |

OTHER PUBLICATIONS

Xiaodong Wang, the International Search Report, dated Sep. 2017, CN.

\* cited by examiner

LIQUID CRYSTAL DISPLAY PANEL AND LIQUID CRYSTAL DISPLAY APPARATUS

The present application claims priority to the Chinese Patent application No. 2016112663226, filed with the Chinese Patent Office on Dec. 29, 2016, and entitled "LIQUID CRYSTAL DISPLAY PANEL AND LIQUID CRYSTAL DISPLAY APPARATUS" which is incorporated herein by reference in its entirety.

TECHNICAL FIELD

The present application relates to the field of display technology, and more particularly to a liquid crystal display panel and a liquid crystal display apparatus.

The statements in this section merely provide background information related to the present application and may not constitute prior art.

BACKGROUND

Liquid crystal display (LCD) apparatuses have numerous advantages, such as thin body, power saving, no radiation, etc., and are widely used. In the market, most of the LCD apparatuses are backlight type LCD apparatuses including a liquid crystal display (LCD) panel and a backlight module. Operational principle of the LCD panel is that liquid crystal molecules are positioned between two substrates paralleled each other, and a driving voltage is applied to two substrates to control orientation of the liquid crystal molecules, further reflecting light rays of the backlight module and generating images.

Thin film transistor liquid crystal display (TFT-LCD) apparatuses currently maintain a leading status in the display field because of low power dissipation, good image quality, high production yield, and other properties. The TFT-LCD apparatus includes a liquid crystal display (LCD) panel and a backlight module. The LCD panel includes a color filter (CF) substrate and a thin film transistor (TFT) substrate, and transparency electrodes on relative inner sides of the above substrates. A liquid crystal molecule layer is positioned between the two substrates. In an existing LCD panel, the CF substrate is front (in here, "front" is defined as angle of human eye 20), and the TFT substrate is correspondingly behind. The CF substrate includes a black matrix layer regarded as a shading layer, to avoid leakage of the background light and improve brightness of the panel.

With the development of technology, the LCD panel of the TFT-LCD apparatuses appears borderless design. To be specific, the TFT substrate is front (in here, "front" is a same as the above "front", and also is defined as angle of human eye), and the CF substrate is behind. Therefore, the shading layer cannot avoid leakage of the background light, and brightness of the LCD panel cannot be improved.

SUMMARY

The aim of the present application is to provide a liquid crystal display (LCD) panel capable of improving brightness of the LCD panel.

The present application further provides an LCD apparatus using the above LCD panel.

The aim of the present application is achieved through the technical scheme as follow. According to one aspect of the present application, the present application provides the LCD panel, where the LCD panel is used in the LCD apparatus. The LCD panel includes a color filter substrate including: a substrate, a shading layer disposed on the substrate, and configured to reflect light rays, and when the light rays is irradiated to the shading layer, the shading layer reflects the light rays, and a color filter layer disposed on the substrate and spaced by the shading layer.

Optionally, the shading layer includes a light reflecting layer disposed on surfaces of the shading layer, and when the light rays is irradiated to the light reflecting layer, the light reflecting layer reflects the light rays. The light reflecting layer is directly disposed on the shading layer, which is easy to achieve and is convenient to control, further improving light reflection.

Optionally, the shading layer includes a first surface connected to the substrate, and the light reflecting layer is disposed on the first surface of the shading layer and the liquid crystal display panel further includes a backlight, the first surface of the shading layer is a surface facing to the backlight. The backlight module of the LCD apparatus is arranged at a side of the color filter substrate, namely the backlight light is arranged at a side of the substrate arranging the color filter substrate. When the backlight module emits a plurality of light rays and the light rays are irradiated to the shading layer through the substrate, the shading layer reflects the light rays irradiated to the first surface of the shading layer to a light guide plate (LGP) through the first surface of the shading layer, further improving utilization of the light rays and the brightness of the LCD panel.

Optionally, the shading layer further includes a second surface, a third surface, a fourth surface, and a fifth surface; and the light reflecting layer is not disposed on the second surface, the third surface, the fourth surface, and the fifth surface.

Optionally, the shading layer further includes a second surface, a third surface, a fourth surface, and a fifth surface; the first surface is adjacent to the second surface, the third surface, the fourth surface, and the fifth surface; the light reflecting layer is disposed on at least one of the second surface, the third surface, the fourth surface, and the fifth surface. When the light rays are irradiated to the surfaces of the shading layer and the light reflecting layer is disposed on the surfaces of the shading layer, the light reflecting layer reflects the light rays, further improving the brightness of the LCD panel.

Optionally, the light reflecting layer covers the first surface. The light reflecting layer covers at least one of the second surface, the third surface, the fourth surface, and the fifth surface. And the light reflecting layer covers at least two of the surface, improving reflection Optionally, the shading layer includes a first surface connected to the substrate; the shading layer further includes a second surface, a third surface, a fourth surface, and a fifth surface; the first surface is adjacent to the second surface, the third surface, the fourth surface, and the fifth surface; the light reflecting layer is disposed on at least one of the second surface, the third surface, the fourth surface, and the fifth surface. The backlight module of the LCD apparatus is arranged at a side of the color filter substrate, namely the backlight light is arranged at a side of the substrate arranging the color filter substrate. When the backlight module emits a plurality of light rays and the light rays are irradiated to the shading layer through the substrate, the shading layer reflects the light rays through at least one of the second surface, the third surface, the fourth surface, and the fifth surface, further improving utilization of the light rays and the brightness of the LCD panel.

Optionally, the shading layer further includes a second surface, a third surface, a fourth surface, and a fifth surface;

and the light reflecting layer covers the second surface, the third surface, the fourth surface, and the fifth surface.

Optionally, the light reflecting layer covers at least one of the second surface, the third surface, the fourth surface, and the fifth surface, improving reflection of the light rays.

Optionally, the shading layer includes a first surface connected to the substrate. The shading layer further includes a second surface, a third surface, a fourth surface, and a fifth surface. The first surface is adjacent to the second surface, the third surface, the fourth surface, and the fifth surface. The light reflecting layer is disposed on at least one of the first surface, the second surface, the third surface, the fourth surface, and the fifth surface. A plurality of convex protrusions or concave protrusions are arranged separately on at least one surface of the first surface, the second surface, the third surface, the fourth surface, and the fifth surface, which makes the light reflecting layer of the shading layer form similar convex protrusions and concave protrusions. When the light rays are irradiated to the shading layer, the convex protrusions and concave protrusions greatly increase light reflecting areas of the surfaces of the shading layer, further improving reflection of the light rays. It should be noted that: when the light rays are directly/obliquely irradiated to the flat, the reflecting light ray is generated orderly. In the embodiment, the light rays are irradiated to the convex protrusions and concave protrusions to generate irregular reflecting light ray, further supplementing brightness of dark places. In the embodiment, the convex protrusions or the concave protrusions are separately disposed on the same surface, in the embodiment, the convex protrusions and the concave protrusions are disposed on the same surface.

Optionally, the shading layer includes: a first surface, connected to the substrate, and the shading layer further includes a second surface, a third surface, a fourth surface, and a fifth surface, where a plurality of convex protrusions or concave protrusions are arranged separately on the first surface, the second surface, the third surface, the fourth surface, and the fifth surface.

Optionally, the shading layer is made of light reflecting material. When the shading layer reflects the light rays through the light reflecting material, which is another way to achieve reflection of the shading layer. Therefore, the surfaces of the shading layer can generate the reflecting light ray at the same time, which improves reflection Optionally, the LCD panel of the embodiment is the curved panel.

The present application further provides the LCD apparatus including the above the LCD panel.

Optionally, the backlight module of the embodiment can be front-light type or be back-light type.

A thin film transistor (TFT) substrate of the LCD panel of the LCD apparatus is front, (in here, "front" is defined as angle of human eye 20), and color filter (CF) substrate is correspondingly behind, which causes that the shading layer cannot avoids leakage of the background light and the shading layer cannot increase brightness of the panel.

The shading layer of the present application reflect the light rays, when the light rays are irradiated to the shading layer, the shading layer reflects the light rays to form the reflecting light my, a utilization of the light source and a brightness of the LCD panel are improved.

BRIEF DESCRIPTION OF DRAWINGS

The drawings included are used for providing further understanding of embodiments of the present application, constitute part of the description, and are used for illustrating implementation manners of the present application, and interpreting principles of the present application together with text description. Apparently, the drawings in the following description are merely some embodiments of the present application, and for those ordinary skilled in the art, other drawings can also be obtained according to the drawings without contributing creative labor. In the drawings.

DETAILED DESCRIPTION

Figure 1:
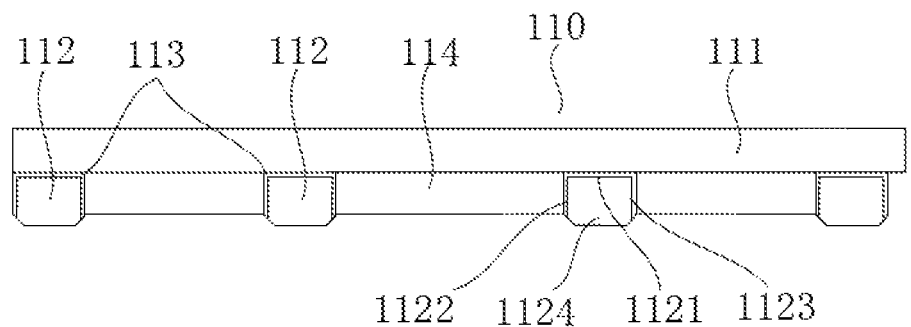
FIG. 1 is a schematic diagram of a color filter substrate of a liquid crystal display (LCD) panel according to an embodiment of the present application.

Specific structure and function details disclosed herein are only representative and are used for the purpose of describing exemplary embodiments of the present application. However, the present application may be specifically achieved in many alternative forms and shall not be interpreted to be only limited to the embodiments described herein.

It should be understood in the description of the present application that terms such as "central", "horizontal", "upper", "lower", "left", "right", "vertical", "horizontal", "top", "bottom", "inner", "outer", etc., indicate direction or position relationships shown based on the drawings, and are only intended to facilitate the description of the present application and the simplification of the description rather than to indicate or imply that the indicated device or element must have a specific direction or constructed and operated in a specific direction, and therefore, shall not be understood as a limitation to the present application. In addition, the terms such as "first" and "second" are only used for the purpose of description, rather than being understood to indicate or imply relative importance or hint the number of indicated technical features. Thus, the feature limited by "first" and "second" can explicitly or impliedly includes one or more features. In the description of the present application, the meaning of "a plurality of" is two or more unless otherwise specified. In addition, the term "comprise" and any variant are intended to cover non-exclusive inclusion.

It should be noted in the description of the present application that, unless otherwise specifically regulated and defined, terms such as "installation," "bonded," and "bonding" shall be understood in broad sense, and for example, may refer to fixed bonding or detachable bonding or integral bonding; may refer to mechanical bonding or electrical bonding; and may refer to direct bonding or indirect bonding through an intermediate medium or inner communication of two elements. For those of ordinary skill in the art, the meanings of the above terms in the present application may be understood according to concrete conditions.

The terms used herein are intended to merely describe concrete embodiments, not to limit the exemplary embodiments. Unless otherwise noted clearly in the context, singular forms "one" and "single" used herein are also intended to comprise plurals. It should also be understood that the terms "comprise" and/or "include" used herein specify the existence of stated features, integers, steps, operation, units and/or assemblies, not excluding the existence or addition of one or more other features, integers, steps, operation, units, assemblies and/or combinations of these.

The present application will be further described in detail below in combination with the drawings and optional embodiments.

As shown in FIG. 1 to FIG. 7, an embodiment of the present application provides a liquid crystal display (LCD) panel and an LCD apparatus.

Figure 3:
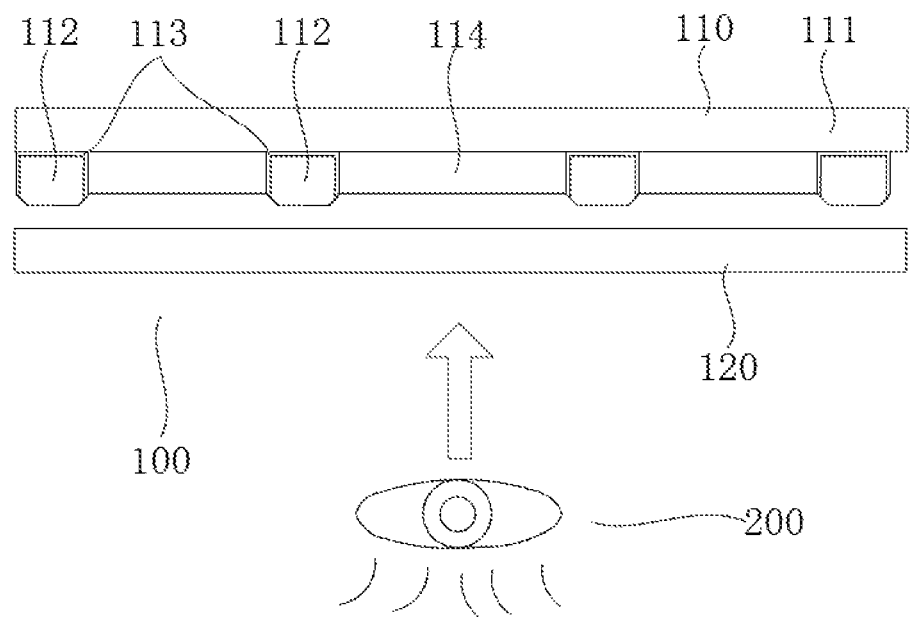
FIG. 3 is a schematic diagram of the LCD panel according to the embodiment of the present application.
Figure 5:
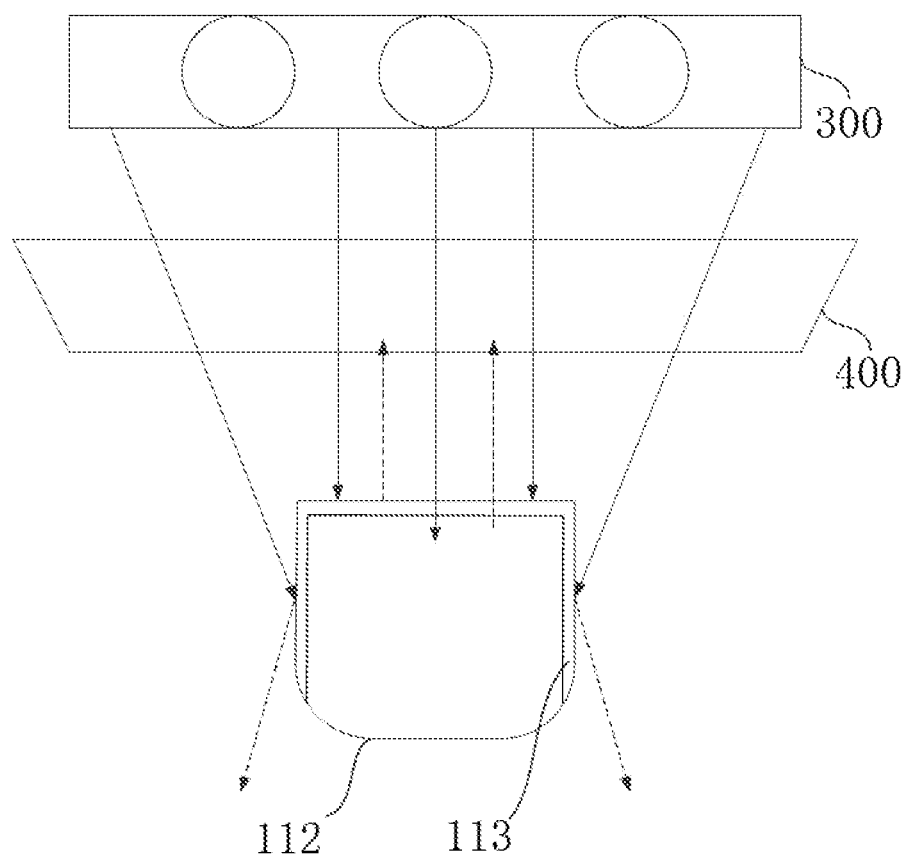
FIG. 5 is a partial enlarged diagram of the LCD panel according to the embodiment of the present application.

In the embodiment of the present application, the present application provides the LCD panel, as shown in FIG. 1, FIG. 3, and FIG. 5, FIG. 1 is a schematic diagram of a color filter substrate of the LCD panel according to an embodiment of the present application, FIG. 3 is a schematic diagram of the LCD panel according to the embodiment of the present application, and FIG. 5 is a partial enlarged diagram of the LCD panel according to the embodiment of the present application.

In one or more embodiments, as shown in FIG. 3, the LCD panel 100 is used in the LCD apparatus, where the LCD panel 100 includes a color filter substrate 110 and a thin film transistor (TFT) substrate 120. To be specific, the TFT substrate 120 of the LCD panel 100 is front (in here, "front" is defined as view of the human eye 200), and the color filter substrate is correspondingly behind, namely the color filter substrate 110 is arranged at the other side of the TFT substrate, namely the color filter substrate 110 is arranged at a back of the TFT substrate.

It should be noted that the color filter substrate and the TFT substrate of the present application can be disposed on a same substrate.

For example, the LCD panel 100 of the embodiment can be a curved panel. However, the LCD panel of the embodiment is limited.

Furthermore, the substrate of the embodiment is a glass substrate, where the glass substrate has good photopermeability, and is easy to arrange. It should be understood that the substrate of the embodiment is a flexible substrate. It should be noted that the substrate of the embodiment is not limited.

As shown in FIG. 1, the color filter substrate 110 includes a substrate 111, a shading layer 112, and a color filter layer 114, where the shading layer 112 is disposed on the substrate 111 to reflect light rays. When the light rays are irradiated to the shading layer 112, the shading layer 112 reflects the light rays to form reflecting light ray. The color filter layer 114 is disposed on the substrate 111 and is spaced by the shading layer. Therefore, the shading layer 112 can reflect the light rays, when the light rays are irradiated to the shading layer 112, the shading layer 112 reflects the light rays to form the reflecting light ray, improving utilization of the light source and brightness of the LCD panel.

In one or more embodiments, to be specific, the shading layer 112 includes a light reflecting layer 113 disposed on a surface of the shading layer 112. When the light rays are irradiated to the light reflecting layer 113, the light reflecting layer 11 reflects the light rays. The light reflecting layer 113 is directly disposed on the shading layer 112, which is easy to achieve and is convenient to control, further improving light reflection. It should be noted that the embodiment can directly deal with the surface of the shading layer (such as brightness characteristics) to achieve light reflection.

To be specific, as shown in FIG. 5, the shading layer 112 includes a first surface 1121, a second surface 1122, a third surface 1123, a fourth surface 1124, and a fifth surface 1125 (the fifth surface is shaded by the fourth surface, and the fifth surface is opposite to the fourth surface), where the first surface 1121, the second surface 1122, the third surface 1123, the fourth surface 1124, and the fifth surface 1125 are connected to the substrate 111. The first surface is adjacent to the second surface 1122, the third surface 1123, the fourth surface 1124, and the fifth surface 1125, respectively. The light reflecting layer 113 is disposed on the first surface 1121, the second surface 1122, the third surface 1123, the fourth surface 1124, and the fifth surface 1125. It is optional way to arrange the light reflecting layer, and it is also optional embodiment of the present application.

As shown in FIG. 5, FIG. 5 is a partial enlarged diagram of the LCD panel according to the embodiment of the present application, or FIG. 5 is an enlarged diagram of a partial matching of the shading layer and the backlight module according to the embodiment of the present application. As shown in FIG. 5, the backlight module of the LCD apparatus is arranged at a side of the color filter substrate, namely the backlight light is arranged at a side of the substrate arranging the color filter substrate. The backlight 300 of the backlight module is regarded as the light source to emits a plurality of light rays (namely arrows from backlight to the shading layer) to pass through a light guide plate (LGP) 400 and be irradiated to the shading layer 112. As the light reflecting layer 113 is disposed on the first surface 1121, the second surface 1122, the third surface 1123, the fourth surface 1124, and the fifth surface 1125, when the light rays are irradiated to the first surface 1121, the second surface 1122, the third surface 1123, the fourth surface 1124, and/or the fifth surface 1125; the first surface 1121, the second surface 1122, the third surface 1123, the fourth surface 1124, and/or the fifth surface 1125 reflect the light rays through the light reflecting layer 113 to form reflecting light ray (dotted arrow as shown in drawings), further improving utilization of the light source and the brightness of the LCD panel.

Furthermore, the light reflecting layer 113 covers the first surface 1121, the second surface 1122, the third surface 1123, the fourth surface 1124, and the fifth surface 1125, to achieve completely reflection and obtain better reflection. However, it should be noted that the reflect light layer 113 may not covers the first surface 1121, the second surface 1122, the third surface 1123, the fourth surface 1124, and the fifth surface 1125. The reflect light layer 113 is only covered on part surfaces of the first surface 1121, the second surface 1122, the third surface 1123, the fourth surface 1124, and the fifth surface 1125, which also can achieve to reflect light.

In one or more embodiments, a plurality of convex protrusions or concave protrusions are disposed on at least one of the first surface 1121, the second surface 1122, the third surface 1123, the fourth surface 1124, and the fifth surface 1125. To be specific, surfaces of the shading layer are configured to the convex protrusions and concave protrusions and the light reflecting layer is disposed on the surfaces of the shading layer, which makes the light reflecting layer of the shading layer form similar convex protrusions and concave protrusions. When the light rays are irradiated to the shading layer, the convex protrusions and concave protrusions greatly increases light reflecting areas of the shading layer, further improving reflection of the light rays. It should be noted that, when the light rays are directly/obliquely irradiated to a flat, the reflecting light ray is generated orderly. In the embodiment, the light rays are irradiated to the convex protrusions and concave protrusions to generate irregular reflecting light ray, further supplementing brightness of dark places. In the embodiment, the convex protrusions or the concave protrusions are separately disposed on same surface, and the convex protrusions and the concave protrusions are disposed on the same surface. It should be understood that the convex protrusions and/or the concave protrusions are disposed on any one or more surface of the shading layer.

Figure 4:
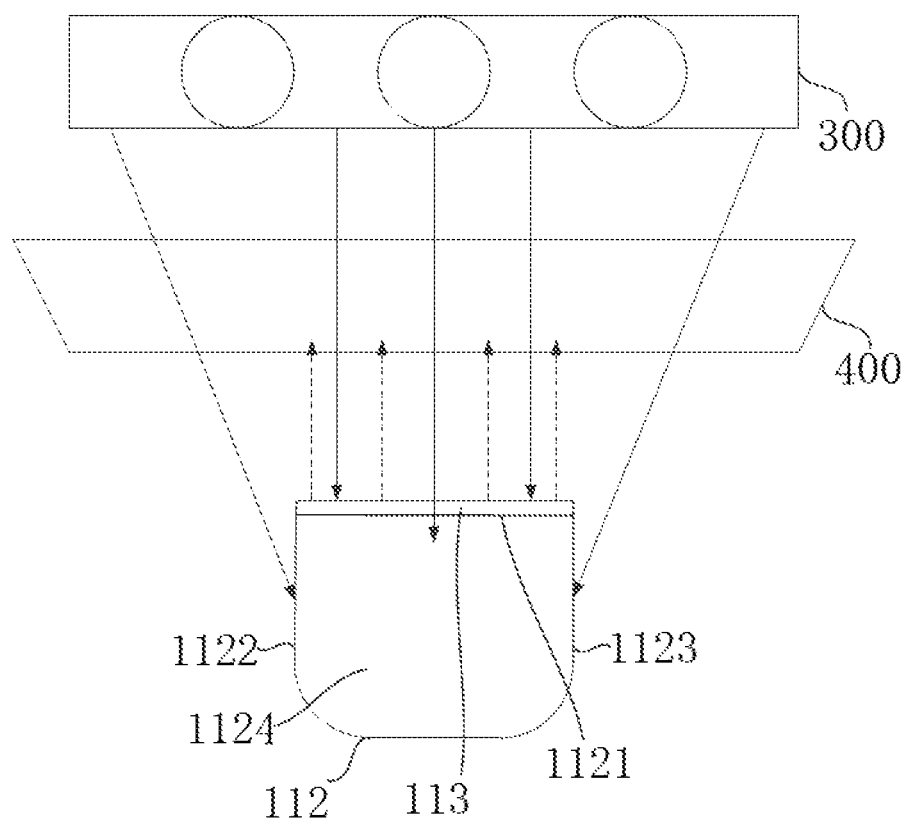
FIG. 4 is a partial enlarged diagram of the LCD panel according to the embodiment of the present application.

In one or more embodiments of the present application, the present application provides the LCD panel, as shown in FIG. 4, FIG. 4 is an enlarged diagram of a partial structure of the LCD panel according to the embodiment of the present application.

In one or more embodiments, combined FIG. 1 with FIG. 3, the LCD panel is used in the LCD apparatus, and the LCD panel includes the color filter substrate and the TFT substrate. To be specific, the TFT substrate of the LCD panel is front (in here, "front" is defined as view of the human eye), and the color filter substrate is correspondingly behind, namely the color filter substrate is arranged at the other side of the TFT substrate, and namely the color filter substrate is arranged at the back of the TFT substrate.

It should be noted that the color filter substrate and the TFT substrate of the present application can be disposed on a same substrate.

For example, the LCD panel 100 of the embodiment is the curved panel. However, the LCD panel of the embodiment is not limited thereto.

Furthermore, the substrate of the embodiment is a glass substrate, where the glass substrate has good photopermeability, and is easy to arrange. The substrate of the embodiment is a flexible substrate. It should be noted that the substrate of the embodiment is not limited thereto.

The color filter substrate includes the substrate, the shading layer, and the color filter layer, where the shading layer is disposed on the substrate to reflect light rays. When the light rays are irradiated to the shading layer, the shading layer reflects the light rays. The color filter layer is disposed on the substrate and is spaced by the shading layer. Therefore, the shading layer can reflect the light rays, when the light rays are irradiated to the shading layer, the shading layer reflects the light rays to form the reflecting light ray, improving utilization of the light source and brightness of the LCD panel.

In one or more embodiments, to be specific, the shading layer includes the light reflecting layer disposed on the surface of the shading layer. When the light rays are irradiated to the light reflecting layer, the light reflecting layer reflects the light rays. The light reflecting layer is directly disposed on the shading layer, which is easy to achieve and is convenient to control, further improving light reflection. It should be noted that the embodiment can directly deal with the surface of the shading layer (such as brightness characteristics) to achieve light reflection.

To be specific, the shading layer includes the first surface 1121, the second surface 1122, the third surface 1123, the fourth surface 1124, and the fifth surface 1125 (the fifth surface is shaded by the fourth surface, and the fifth surface is opposite to the fourth surface), where the first surface 1121, the second surface 1122, the third surface 1123, the fourth surface 1124, and the fifth surface 1125 are connected to the substrate 111. The first surface is adjacent to the second surface 1122, the third surface 1123, the fourth surface 1124, and the fifth surface 1125, respectively. The light reflecting layer 113 is disposed on the first surface 1121, and the light reflecting layer 113 is not disposed on the second surface 1122, the third surface 1123, the fourth surface 1124, and the fifth surface 1125. The backlight module of the LCD apparatus is arranged at the side of the color filter substrate, namely the backlight light is arranged at a side of the substrate arranging the color filter substrate. When the backlight module emits the light rays, and the light rays are irradiated to the shading layer, the shading layer reflects the light rays irradiated to the first surface 1121 of the shading layer to the LGP 400 through the first surface 1121 of the shading layer, further improving utilization of the light source and the brightness of the LCD panel. In the embodiment, the first surface 1121 of the shading layer is the closer to the LGP 400 and the backlight module, therefore, when the light rays are irradiated to the first surface 1121 of the shading layer, the first surface 1121 of the shading layer can quickly reflects the light rays to the LGP 400.

In one or more embodiments, a plurality of convex protrusions or concave protrusions are disposed on the first surface 1121 of the shading layer. To be specific, the light reflecting layer disposed on the shading layer also forms similar convex protrusions and concave protrusions. When the light rays are irradiated to the first surface 1121 of the shading layer, the convex protrusions and concave protrusions greatly increases light reflecting areas of the first surface of the shading layer, further improving reflection of the light rays. It should be noted that: when the light rays are directly/obliquely irradiated to a flat, the reflecting light ray is generated orderly. In the embodiment, the light rays are irradiated to the convex protrusions and concave protrusions to generate irregular reflecting light ray, further supplementing brightness of dark places. In the embodiment, the convex protrusions or the concave protrusions are separately disposed on the first surface of the shading layer, and the convex protrusions and the concave protrusions are disposed on the first surface of the shading layer.

In one or more embodiments, the light reflecting layer covers whole first surface 1121 of the shading layer to achieve completely reflection and obtain better reflection. However, it should be noted that the light reflecting layer 113 may not be covered on the first surface 1121 of the shading layer, and the light reflecting layer 113 is only covered on a part of the first surface of the shading layer, which also can achieve the reflection.

Figure 6:
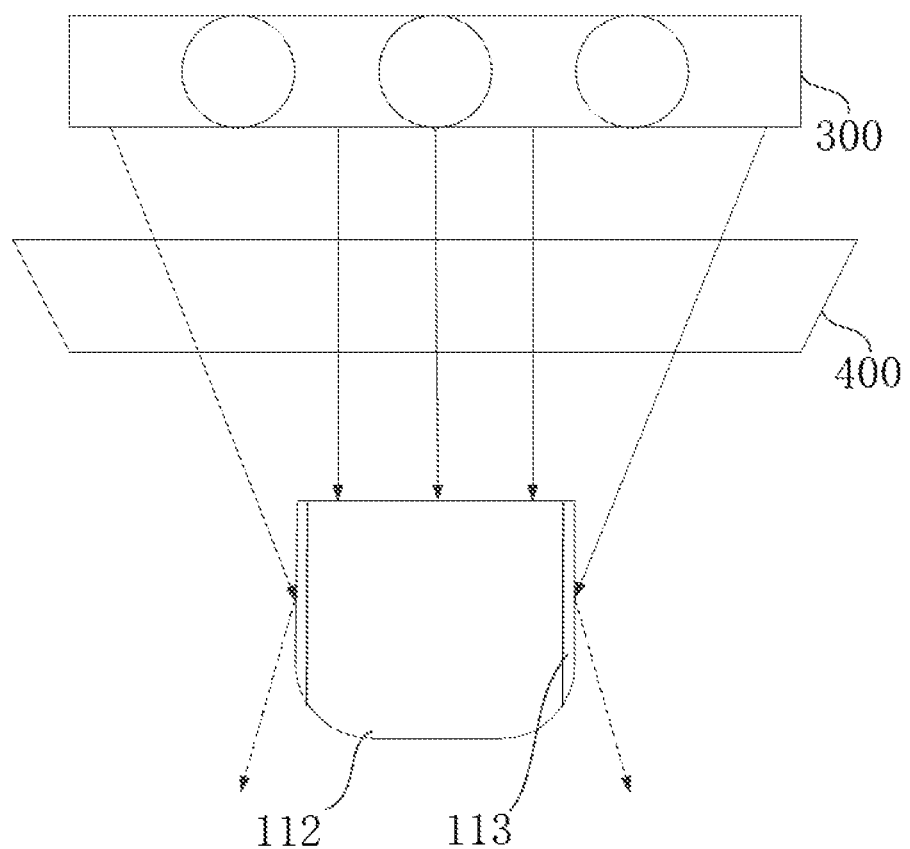
FIG. 6 is a partial enlarged diagram of the LCD panel according to the embodiment of the present application.

In one or more embodiments of the present application, the present application provides the LCD panel, as shown in FIG. 6, FIG. 6 is an enlarged diagram of a partial structure of the LCD panel according to the embodiment of the present application.

In one or more embodiments, combined FIG. 1 with FIG. 3, the LCD panel is used in the LCD apparatus, and the LCD panel includes the color filter substrate and the TFT substrate. To be specific, the TFT substrate of the LCD panel is front (in here, "front" is defined as view of the human eye), and the color filter substrate is correspondingly behind, namely the color filter substrate 110 is arranged at the other side of the TFT substrate, and namely the color filter substrate is arranged at the back of the TFT substrate.

It should be noted that the color filter substrate and the TFT substrate of the present application can be disposed on the same substrate.

For example, the LCD panel 100 of the embodiment is the curved panel. However, the LCD panel of the embodiment is not limited thereto.

Furthermore, the substrate of the embodiment is a glass substrate, where the glass substrate has good photopermeability, and is easy to arrange. The substrate of the embodiment is flexible substrate. It should be noted that the substrate of the embodiment is not limited thereto.

The color filter substrate includes the substrate, the shading layer, and the color filter layer, where the shading layer is disposed on the substrate to reflect light rays. When the light rays are irradiated to the shading layer, the shading layer reflects the light rays. The color filter layer is disposed on the substrate and is spaced by the shading layer. Therefore, the shading layer can reflect the light rays, when the light rays are irradiated to the shading layer, the shading layer reflects the light rays to form the reflecting light ray, improving utilization of the light source and brightness of the LCD panel.

In one or more embodiments, to be specific, the shading layer includes the light reflecting layer disposed on the surface of the shading layer. When the light rays are irradiated to the light reflecting layer, the light reflecting layer reflects the light rays. The light reflecting layer is directly disposed on the shading layer, which is easy to achieve and is convenient to control, further improving light reflection. It should be noted that the embodiment can directly deal with the surface of the shading layer (such as brightness characteristics) to achieve light reflection.

To be specific, the shading layer includes the first surface 1121, the second surface 1122, the third surface 1123, the fourth surface 1124, and the fifth surface 1125 (the fifth surface is shaded by the fourth surface, and the fifth surface is opposite to the fourth surface), where the first surface 1121, the second surface 1122, the third surface 1123, the fourth surface 1124, and the fifth surface 1125 are connected to the substrate 111. The first surface is adjacent to the second surface 1122, the third surface 1123, the fourth surface 1124, and the fifth surface 1125, respectively. The light reflecting layer 113 is disposed on at least one of the second surface 1122, the third surface 1123, the fourth surface 1124, and the fifth surface 1125. When the backlight module emits the light rays and the light rays are irradiated to the shading layer, the light reflecting layer 113 of the shading layer reflects the light rays, further improving the brightness of the LCD panel. The light reflecting layer 113 covers at least one of the second surface 1122, the third surface 1123, the fourth surface 1124, and the fifth surface 1125, improving reflection of the light rays.

Furthermore, in The present application, the light reflecting layer 113 is disposed on the second surface 1122, the third surface 1123, the fourth surface 1124, and the fifth surface 1125, when the light rays are irradiated to the light reflecting layer 113, the second surface 1122, the third surface 1123, the fourth surface 1124, and the fifth surface 1125 reflect the light rays through the light reflecting layer 113 to form the reflecting light ray (dotted arrow as shown in drawings), further improving utilization of the light source and the brightness of the LCD panel.

In one or more embodiments, a plurality of convex protrusions or concave protrusions are arranged separately on any one or more of the second surface 1122, the third surface 1123, the fourth surface 1124, and the fifth surface 1125, which makes the light reflecting layer of the shading layer form similar convex protrusions and concave protrusions. When the light rays are irradiated to the shading layer, the convex protrusions and concave protrusions greatly increase light reflecting areas of the surfaces of the shading layer, further improving reflection of the light rays. It should be noted that: when the light rays are directly/obliquely irradiated to the flat, the reflecting light ray is generated orderly. In the embodiment, the light rays are irradiated to the convex protrusions and concave protrusions to generate irregular reflecting light ray, further supplementing brightness of dark places. In the embodiment, the convex protrusions or the concave protrusions are separately disposed on the second surface 1122, the third surface 1123, the fourth surface 1124, and/or the fifth surface 1125. It should be understood that the convex protrusions and the concave protrusions are disposed on the second surface 1122, the third surface 1123, the fourth surface 1124, and/or the fifth surface 1125.

However, it should be noted that light reflecting layer is disposed on any one or more surface of the shading layer, there are no example to illustrate.

Figure 2:
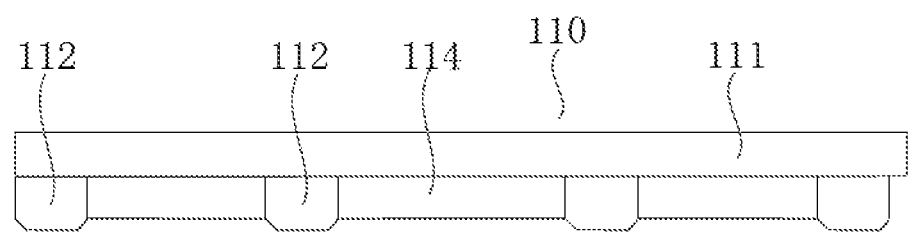
FIG. 2 is a schematic diagram of the color filter substrate of the LCD panel according to the embodiment of the present application.
Figure 7:
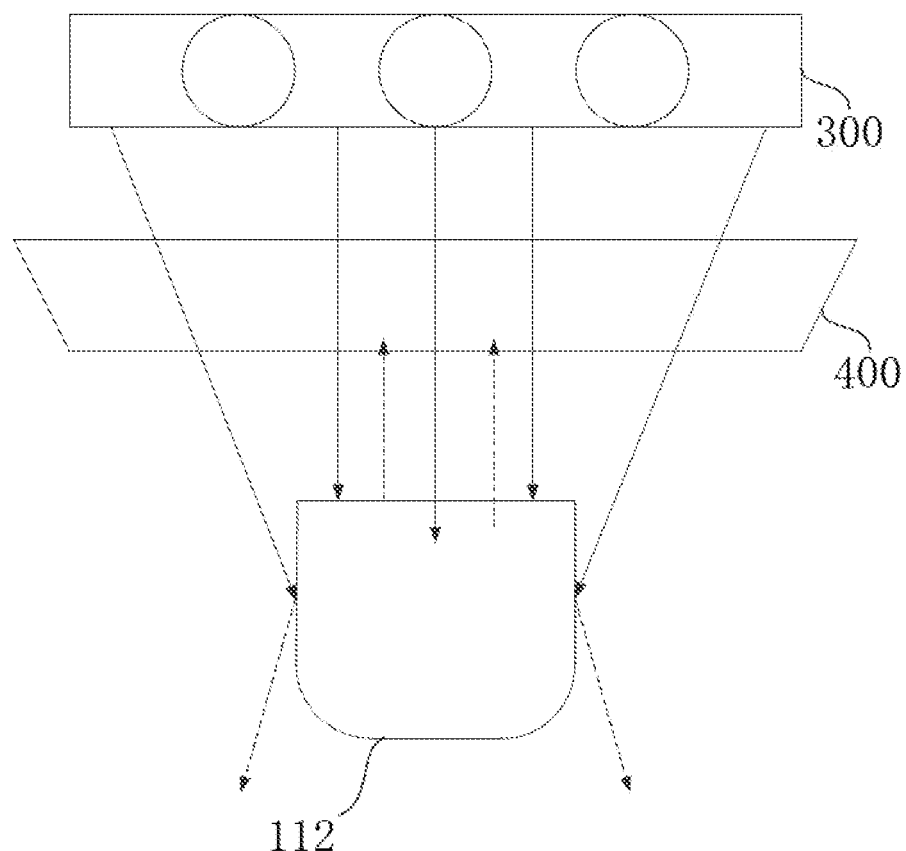
FIG. 7 is a partial enlarged diagram of the LCD panel according to the embodiment of the present application.

In one or more embodiments of the present application, the present application provides the LCD panel, as shown in FIG. 2 and FIG. 7, FIG. 7 is a partial enlarged diagram of the LCD panel according to the embodiment of the present application.

In one or more embodiments, the shading layer 112 is made of light reflecting material. When the shading layer 112 reflects the light rays through the light reflecting material, which is another way to achieve reflection of the shading layer. Therefore, the surfaces of the shading layer can generate the reflecting light ray at the same time, improving reflection.

For example, the LCD panel 100 of the embodiment is the curved panel. However, the LCD panel of the embodiment is not limited thereto.

The substrate of the embodiment is a glass substrate, where the glass substrate has good photopermeability, and is easy to arrange. The substrate of the embodiment is the flexible substrate. It should be noted that the substrate of the embodiment is not limited thereto.

Furthermore, a plurality of convex protrusions or concave protrusions are arranged separately on any one or more surface of the shading layer of the present application, which makes the light reflecting layer of the shading layer form similar convex protrusions and concave protrusions. When the light rays are irradiated to the shading layer, the convex protrusions and concave protrusions greatly increase light reflecting areas of the shading layer, further improving reflection of the light rays. It should be noted that, when the light rays are directly/obliquely irradiated to the flat, the reflected light is generated orderly. In the embodiment, the light rays are irradiated to the convex protrusions and concave protrusions to generate irregular reflecting light ray, further supplementing brightness of dark places. In the embodiment, the convex protrusions or the concave protrusions are separately disposed on the same surface. It should be understood that the convex protrusions and the concave protrusions are disposed on the surface.

In one or more embodiments of the present application, the present application provides the LCD apparatus, where the LCD apparatus includes the LCD panel and the backlight module. The specific structure and connected relationship of the LCD panel of the embodiment refer to the LCD panel of the above embodiment, as shown in FIG. 1 to FIG. 7. There is no detailed description for the LCD panel. The backlight module of the embodiment is regarded as the light source to provide sufficient brightness and uniform light rays. The backlight module of the embodiment can be front-light type, and also be back-light type. It should be noted that the backlight module is not limited thereto.

As the above, it should be understood that the present application has been described with reference to certain optional and alternative embodiments which are intended to be exemplary only and do not limit the full scope of the present application as set forth in the appended claims.

What is claimed is:

1. A liquid crystal display (LCD) apparatus, comprising a TFT substrate, a backlight module, a color filter substrate counter to the TFT substrate; and the color filter substrate comprises:
- a substrate, wherein the backlight module is arranged on a back side of the substrate;
- a shading layer disposed on a front side of the substrate opposite to the backlight module, wherein the shading layer is configured to reflect light rays of the backlight module, and when the light rays are irradiated to the shading layer, the shading layer reflects the light rays; and
- a color filter layer disposed on the substrate and spaced by the shading layer;
- wherein the shading layer comprises a light reflecting layer disposed on a surface of the shading layer; and when the light rays are irradiated to the light reflecting layer, the light reflecting layer reflects the light rays;
- wherein the shading layer comprises a first surface connected to the substrate, and the light reflecting layer is disposed directly on the first surface of the shading layer; and the shading layer further comprises a second surface, a third surface, a fourth surface, and a fifth surface, and the first surface is adjacent to the second surface, the third surface, the fourth surface, and the fifth surface;
- wherein the light reflecting layer covers the first surface; and the light reflecting layer directly covers at least one of the second surface, the third surface, the fourth surface, and the fifth surface; and a plurality of convex protrusions or concave protrusions are arranged separately on the first surface, the second surface, the third surface, the fourth surface, and the fifth surface.

2. A liquid crystal display (LCD) apparatus, comprising a TFT substrate, a backlight module, a color filter substrate counter to the TFT substrate; and the color filter substrate comprises:
- a substrate, wherein the backlight module is arranged on a back side of the substrate;
- a shading layer disposed on a front side of the substrate opposite to the backlight module, wherein the shading layer is configured to reflect light rays of the backlight module, and when the light rays are irradiated to the shading layer, the shading layer reflects the light rays; and
- a color filter layer disposed on the substrate and spaced by the shading layer;
- wherein the shading layer comprises a light reflecting layer disposed on a surface of the shading layer; and when the light rays are irradiated to the light reflecting layer, the light reflecting layer reflects the light rays;
- wherein the shading layer comprises a first surface connected to the substrate, and the light reflecting layer is disposed directly on the first surface of the shading layer; and the shading layer further comprises a second surface, a third surface, a fourth surface, and a fifth surface, and the first surface is adjacent to the second surface, the third surface, the fourth surface, and the fifth surface; and the light reflecting layer is disposed on at least one of the second surface, the third surface, the fourth surface, and the fifth surface;
- wherein the light reflecting layer covers the first surface; and the light reflecting layer directly covers at least one of the second surface, the third surface, the fourth surface, and the fifth surface.

3. The liquid crystal display apparatus according to claim 2, wherein
a plurality of convex protrusions or concave protrusions are arranged separately on at least one surface of the first surface, the second surface, the third surface, the fourth surface, and the fifth surface.

4. The liquid crystal display apparatus according to claim 2, wherein the light reflecting layer directly covers the second surface, the third surface, the fourth surface, and the fifth surface.

5. The liquid crystal display apparatus according to claim 2,
wherein a plurality of convex protrusions or concave protrusions are arranged separately on the first surface, the second surface, the third surface, the fourth surface, and the fifth surface.

6. The liquid crystal display apparatus according to claim 2, wherein the LCD panel is a curved LCD panel.

7. The liquid crystal display apparatus according to claim 2,
wherein a plurality of convex protrusions and concave protrusions are arranged separately on at least one surface of the first surface, the second surface, the third surface, the fourth surface, and the fifth surface.

8. The liquid crystal display apparatus according to claim 2,
wherein a plurality of convex protrusions and concave protrusions are arranged separately on the first surface, the second surface, the third surface, the fourth surface, and the fifth surface.

* * * * *